United States Patent Office 3,562,831
Patented Feb. 16, 1971

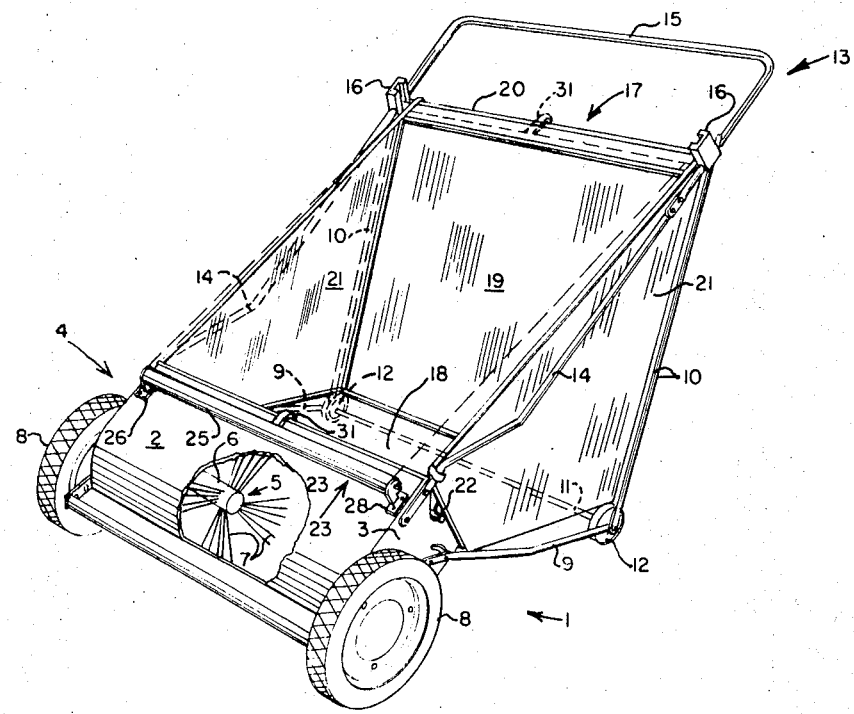
FIG. I
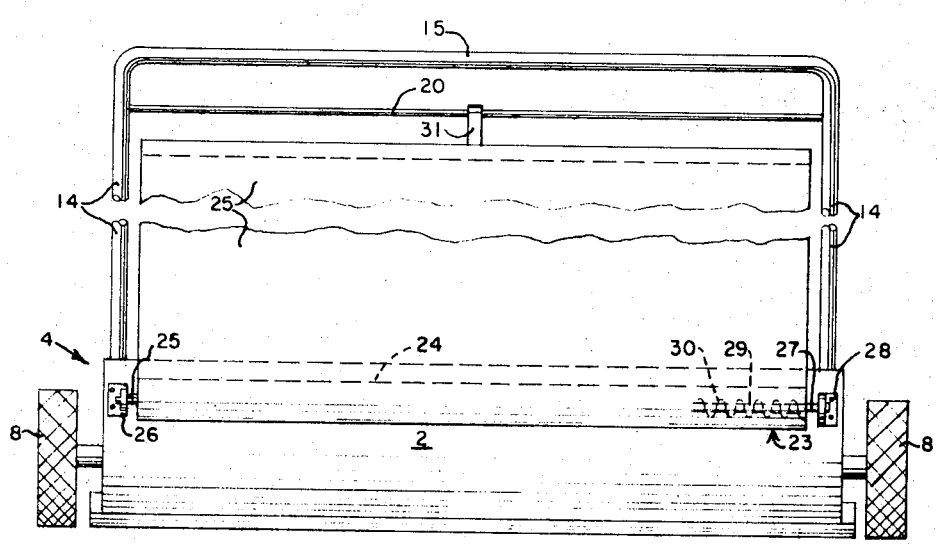
FIG. 2
INVENTOR.
BERNARD R. KOWALSKI

3,562,831
WINDSCREEN ATTACHMENT FOR LAWN SWEEPERS
Bernard R. Kowalski, 2256 McEwan St., Saginaw, Mich. 48602
Filed Apr. 18, 1969, Ser. No. 817,320
Int. Cl. E01h 1/02
U.S. Cl. 15—79                                        6 Claims

ABSTRACT OF THE DISCLOSURE

A lawn sweeper having a wheeled frame on which are supported a rotary sweeper unit and a container having an open side through which swept material may enter the container. A rolled sheet of flexible material is mounted on the frame and may be unrolled to occupy a position extended from the sweeper unit and overlying the open side of the container to provide a windscreen. The flexible sheet may be latched in overlying relation to the container, but may be restored automatically to its rolled condition.

---

The invention disclosed herein relates to lawn sweepers of the kind having a rotary brush which sweeps leaves, trash and other debris from a lawn into a receptacle supported by the sweeper and having an open side through which the swept material enters the receptacle. More particularly, the invention relates to a windscreen attachment for a lawn sweeper and which may be extended from a normal, rolled condition to an operative condition in which it overlies the open side of the debris collecting receptacle and prevents the contents thereof from being blown out by wind.

A lawn sweeper conventionally includes a wheeled frame having an arcuate housing at its forward end within which is journaled a rotatable brush that rotates in such direction as to sweep leaves, trash, and other debris from a lawn into a basket or receptacle which removably is supported on the frame. The receptacle conventionally includes a bottom, a rear wall, and side walls, but has an open side confronting the sweeper so as to permit material to be swept into and collected in the receptacle.

A lawn sweeper frequently must be used on windy days. It is not uncommon, therefore, for the wind to blow the contents of the receptacle out of the latter. Accordingly, it is desirable to provide a windscreen which will overlie the open side of the receptacle so as to prevent loss of the contents. The desirability of such a windscreen has been recognized heretofore and various kinds of protective devices have been proposed. The known devices are not altogether satisfactory, however, for a number of reasons. For example, some of the known devices are supported by the receptacle itself and, therefore, may interfere with the loading or unloading of the receptacle. Others of the known devices are supported by the sweeper frame in a permanently protective position. A device of this kind also may interfere with the loading and unloading of the receptacle and, in addition, may provide a serious obstacle to the attachment and detachment of the receptacle to and from the sweeper frame.

An object of this invention is to provide a protective windscreen for a lawn sweeper and which overcomes the disadvantages of known devices for similar purposes.

Another object of the invention is to provide a lawn sweeper windscreen which readily may be adjusted from an inoperative, out of the way position to an operative position, and return.

A further object of the invention is to provide an attachment of the character referred to and which is inexpensive to manufacture and simple to install and use.

Other objects and advantages of the invention will be pointed out specifically or will become apparent from the following description when it is considered in conjunction with the appended claims and the accompanying drawing, in which:

FIG. 1 is a perspective view of a conventional lawn sweeper provided with an attachment constructed in accordance with the invention; and FIG. 2 is a fragmentary, front elevational view of the sweeper and attachment and illustrating the attachment in its operative position.

Apparatus constructed in accordance with the invention is adapted for use in conjunction with a conventional lawn sweeper having a frame 1 comprising an arcuate panel 2 having side members 3 at each end thereof forming a housing 4 in which is journaled a sweeper assembly 5 comprising a shaft 6 fitted with bristles 7 that are adapted to engage the surface of a lawn or the like and sweeping debris therefrom. The shaft 6 is driven by gearing (not shown) from wheels 8 in a conventional manner.

The sweeper frame also includes struts 9 fixed at their forward ends to the side members 3 and at their rearward ends to upstanding braces 10. A crossbar 11 spans the rear ends of the struts 9 and journals rear wheels 12. A generally U-shaped handle 13 includes parallel arms 14 fixed at their lower ends to the frame panels 3 and are joined at their opposite ends by a crossbar 15. Secured to the arms 14 adjacent the crossbar 15 is a pair of socket members 16.

A debris receptacle 17 is adapted for removable assembly with the frame 1 and comprises a relatively flat bottom 18 at the rear of which is an upstanding wall 19. At the upper end of the wall 19 is a rod 20, the opposite ends of which are removably accommodated in the sockets 16. The receptacle has a pair of side walls 21 which are provided at their forward ends with coupling devices 22 that removably fit into slots formed in the side frame members 3. The forward side of the receptacle 17 is open.

The apparatus thus far described comprises a conventional lawn sweeper having a removable receptacle with an open side into which leaves and other debris may be swept by the sweeper unit 5.

A windscreen constructed according to the invention is designated generally by the reference character 23 and comprises a roller 24 to which one end of a sheet 25 of flexible material is secured by staples, adhesive, or any other suitable means (not shown). Extending from one end of the roller 24 is a cylindrical shaft or spindle 25 which is accommodated in a socket or opening formed in a bracket 26 that is screwed or otherwise suitably fixed to the arcuate panel 2. From the other end of the roller 24 extends a flattened shaft or spear 27 which is accommodated in a socket or slot formed in a mounting bracket 28 that also may be screwed to the panel 2. Preferably, the roller 24, the shafts 25 and 27 and the mounting brackets 26 and 28 are similar to the corresponding elements of a conventional window shade roller, and the shaft 27 is carried by a spindle 29 that is rotatably accommodated in the roller 24 and constantly biased in one direction of rotation by a spring 30, as is conventional in window shade roller constructions. The sheet 25 has a free end to which is secured a hook or latch finger 31 that may be hooked over the rod 20 of the receptacle, when desired. The width of the sheet 25 should be such as substantially to span the width of the open side of the receptacle 17.

To assemble the apparatus, the brackets 26 and 28 are secured to the panel 2 in spaced apart relation sufficient to enable the shafts 25 and 27 to be accommodated in the sockets of their respective brackets. In its normal condition, the sheet 25 will be rolled about the roller 24 with the finger 31 hooked to the upper edge of the panel 2.

When it is desired to utilize the windscreen, the sheet 25 may be unwound from the roller, thereby causing the latter to rotate and stressing the spring 30 in such manner as to tend to rewind the sheet on the roller. The sheet 25 may be unwound a distance sufficient to enable it to extend from the housing 4 toward the bar 20 and in overlying relation to the open side of the receptacle 17. The sheet may be maintained in its operative position by hooking the finger 31 over the bar 20.

When the windscreen is in its operative position, it shields the contents of the receptacle from any wind, but does not interfere with the delivery of debris to the receptacle by the brush assembly 5.

When the receptacle is full, the latch finger 31 may be unhooked from the crossbar 20, whereupon the spring 30 will rewind the sheet and retain it in its inoperative position. The receptacle 17 may be removed from the frame and emptied, following which it may be returned to the frame and the entire process repeated.

The disclosed embodiment is representative of a presently preferred form of the invention, but is intended to be illustrative rather than definitive thereof. The invention is defined in the claims.

I claim:

1. A lawn sweeper construction comprising a frame; sweeper means carried by said frame; receiver means having an open side; means mounting said receiver means on said frame in a position to enable material to be swept through said open side by said sweeper means; a flexible, rolled windscreen; and means mounting said windscreen on said frame adjacent said sweeper means, said windscreen being capable of being unrolled to occupy a position extended from said sweeper means and overlying said open side of said receiver means.

2. The construction set forth in claim 1 including latch means for releasably holding said windscreen in said extended position.

3. The construction set forth in claim 1 wherein said windscreen comprises a roller and an elongated sheet having one of its ends secured to said roller.

4. The construction set forth in claim 3 wherein said mounting means comprises shaft means at each end of said roller and socket means accommodating each of said shaft means.

5. The construction set forth in claim 4 wherein said frame includes a housing overlying said sweeper means, and wherein said socket means are carried by said housing.

6. The construction set forth in claim 1 including means normally biasing said windscreen to a rolled condition.

References Cited

UNITED STATES PATENTS

| | | | |
|---|---|---|---|
| 2,767,414 | 10/1956 | Parker et al. | 15—83 |
| 3,099,122 | 7/1963 | Sakatani | 15—79UX |

EDWARD L. ROBERTS, Primary Examiner

U.S. Cl. X.R.

15—83; 56—400.02